Aug. 4, 1953
J. J. SHELLEY
2,647,454
OPEN FIRE COOKING DEVICE
Filed Dec. 29, 1950
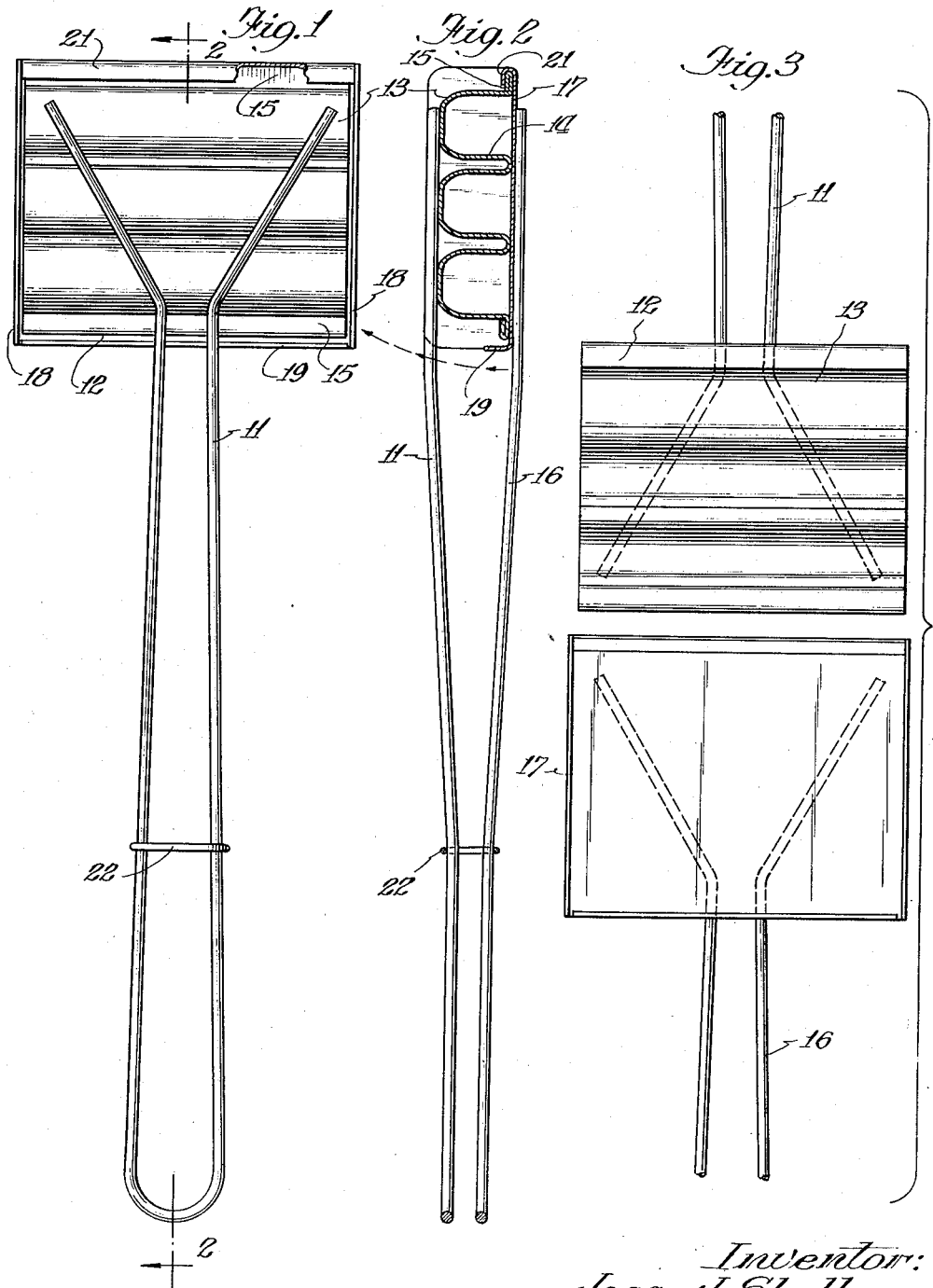
Inventor:
Jesse J. Shelley
By: Alois W. Graf
Attorney Patented Aug. 4, 1953

2,647,454

UNITED STATES PATENT OFFICE 2,647,454

OPEN FIRE COOKING DEVICE

Jesse J. Shelley, Chicago, Ill.

Application December 29, 1950, Serial No. 203,394

2 Claims. (Cl. 99—441)

The present invention relates to a cooking device for open fires; and more particularly a cooking device to be used with ground meat, such as hamburger, to be served in hot-dog buns.

For picnics, outdoor fire-places and other open fires it has been found advantageous to cook ground meat or hamburger in elongated forms so that the cooked product will fit into a finger or hot-dog bun. The resultant product offers a different sensation to the taste than does a hamburger cooked in the flat or more conventional manner.

Therefore, in accordance with the present invention a device has been made for producing a new and different food product.

It, therefore, is an object of the present invention to provide a new and improved cooking device for ground meat.

A still further object of the present invention is to provide an improved cooking device for shaping and cooking ground meat in a novel manner.

Other and further objects of the present invention subsequently will become apparent by reference to the following description taken in conjunction with the accompanying drawings, wherein:

Figure 1 is a plan view of the cooking device in the normal position of use;

Figure 2 is a cross-sectional view as seen in the direction of the arrows 2—2 of Figure 1; and Figure 3 is a view of the device when opened preparatory to use or for removing cooked food.

Referring to the drawings there is shown a cooking device having a handle 11, which supports a corrugated metal member 12 having a plurality of large corrugations 13, and several smaller corrugations 14. On opposite edges of the member 12 the edges are folded over to form stiffening edge portions 15. The larger corrugations 13 are arranged to be filled with ground meat or hamburger. The smaller corrugations 14 are provided so that heat may be applied to all sides of the meat contained within the larger corrugations 13.

Another handle 16 supports a flat sheet metal member 17 having along two of its sides upturned edges 18, which close off the ends of the corrugations 13 in the corrugated member 12, as may be seen from Figure 2. Along the bottom edge an upturned portion 19 may be formed to facilitate handling when the two portions of the device are in normal closed cooperative relation. In order that the two portions of the device may be conveniently placed in register and held together, the upper edge of the sheet 17 is folded over at 21 to receive the folded reinforced edge 15 of the corrugated member 12. When the two portions of the device are in the position shown in Figures 1 and 2, the two handles 11 and 16 may be secured together by a suitable fastening member 22, which may be in the form of a loop of wire.

Figure 3 is a partial view showing the two members 17 and 12 separated as would be the case when the device is either to be loaded or unloaded. Ground meat, such as hamburger, is placed into the larger corrugations 13 shown in Figure 3 so as to substantially fill these corrugations. When this has been done the sheet metal member 17 is placed in register with the corrugated member 12. Heat may be applied alternately to both members during the cooking process. From an examination of the cross-section shown in Figure 2 it will be seen that heat will be applied to a mass of meat or food at substantially equal distances from a center in a corrugation 13. By controlling the application of heat, the rate of cooking can be varied and the degree of cooking likewise can be determined. This will produce a distinct difference in the taste sensation when the meat is eaten as compared to similar meat fried in flat patties, as is more common.

While it has been shown particularly in Figure 2 that in effect a hinged-like relation is obtained between the two members 12 and 17 by means of the turned over portion 21, it will be appreciated that any other means may be employed along the upper edges of these two members to provide a similar interlocking connection. It will also be appreciated that the upturned edge 19 may be varied in size or configuration or dispensed with; although it has been found preferable to utilize some such means to help hold the two members together while the latching or locking member 22 is bein applied.

While for the purpose of illustrating and describing the present invention a preferred embodiment has been shown in the drawing, it is to be understood that the invention is not to be limited thereby, since such variations in the construction and in the components employed are contemplated as may be commensurate with the spirit and the scope of the invention set forth in the accompanying claims.

I claim as my invention:

1. A radiant heat cooking device for ground meat comprising a handle supporting a corrugated sheet metal member having large and small alternate corrugations arranged perpendicular to said handle, said corrugations extending between two parallel planes, another handle supporting a flat sheet metal member having parallel edge portions perpendicular to the remainder of said metal member for closing the ends of said corrugations when said members are placed together thereby to form a plurality of separate enclosed compartments, each compartment being subject to radiant heat on each surface thereof, and means along the outer edges of said members remote from said handles for removably connecting together said members comprising on the flat member a folded over position and on the corrugated member a flat projecting edge portion to fit within said folded over portion.

2. A radiant heat cooking device for ground meat comprising a handle supporting a corrugated sheet metal member having alternate large and small corrugations arranged perpendicular to said handle and extending between two parallel planes, said corrugated metal member having two parallel edges extending outwardly in one of said planes, and another handle supporting a flat sheet metal member having parallel edge portions perpendicular to the remainder of said metal member for closing the ends of said corrugations when said two members are placed together thereby to form a plurality of enclosed compartments for shaping said ground meat, folded over means along the outer edge of said flat member remote from said handle for removably interlocking said members by engagement with one of said parallel edges of said corrugated member, and an upright portion on said flat member to engage the other edge of the corrugated member, each of said compartments being so arranged that every surface of the compartment may be subjected directly to radiant heat by rotation by means of said handles.

JESSE J. SHELLEY.

References Cited in the file of this patent

UNITED STATES PATENTS

| Number | Name | Date |
| --- | --- | --- |
| 592,058 | Kolb | Oct. 19, 1897 |
| 1,020,004 | Wishman | Mar. 12, 1912 |
| 1,490,177 | Matson | Apr. 15, 1924 |
| 1,615,122 | Gordon | Jan. 18, 1927 |
| 1,627,541 | Katzinger | May 3, 1927 |
| 1,945,165 | Smith | Jan. 30, 1934 |
| 1,957,133 | Davis | May 1, 1934 |
| 1,981,082 | Smith | Nov. 20, 1934 |
| 2,317,388 | Lako | Apr. 27, 1943 |
| 2,463,439 | Strietelmeier | Mar. 1, 1949 |
| 2,514,281 | Hobbs | July 4, 1950 |